United States Patent [19]

Tani et al.

[11] Patent Number: 5,182,314
[45] Date of Patent: Jan. 26, 1993

[54] FLEXIBLE POLYURETHANE FOAMS AND PROCESS FOR PRODUCING SAME

[75] Inventors: Kensuke Tani; Yoshiaki Tonomura, both of Yokohama, Japan

[73] Assignee: 501 Nippon Polyurethane Industry Co., Ltd., Tokyo, Japan

[21] Appl. No.: 589,320

[22] Filed: Sep. 27, 1990

[30] Foreign Application Priority Data

Nov. 30, 1989 [JP] Japan .................. 1-312189

[51] Int. Cl.$^5$ .................. C08G 18/70; C08J 9/08
[52] U.S. Cl. .................. 521/160; 521/117; 521/127; 521/129; 521/163; 521/168; 521/170
[58] Field of Search .............. 521/137, 159, 172, 173, 521/107, 122, 127, 129, 903, 117, 160, 163, 168, 170

[56] References Cited

U.S. PATENT DOCUMENTS

| | | | |
|---|---|---|---|
| 4,256,849 | 3/1981 | Ick et al. | 521/129 |
| 4,263,411 | 4/1981 | Bak | 528/55 |
| 4,611,083 | 9/1986 | Buethe et al. | 521/159 |
| 4,731,392 | 3/1988 | Streu et al. | 521/172 |
| 4,806,571 | 2/1989 | Knobel et al. | 521/107 |
| 4,816,494 | 3/1989 | Watson, Jr. et al. | 521/137 |
| 4,937,273 | 6/1990 | Okuyama et al. | 521/122 |

FOREIGN PATENT DOCUMENTS 57-109820  1/1982  Japan .
58-548     1/1983  Japan .

*Primary Examiner*—John Kight, III
*Assistant Examiner*—John M. Cooney, Jr.
*Attorney, Agent, or Firm*—Davis Hoxie Faithfull & Hapgood

[57] ABSTRACT

A method for producing a flexible polyurethane foam by the reaction of an active-hydrogen-containing component composed of an active hydrogen compound, a blowing agent, and an additive with an organic polyisocyanate compound: said blowing agent being carbon dioxide which is generated by the reaction of water with free isocyanate groups, said organic polyisocyanate compound being a mixture of diphenylmethane diisocyanates and polyphenylmethane polyisocyanate, which the mixture contains said diphenylmethane diisocyanate and said polyphenylmethane polyisocyanate in a mixing ratio of not more than 1.0 and 4,4'-MDI in a ratio of not more than 60% by weight based on the whole isocyanate mixture, and said polyphenylmethane polyisocyanate having an average functionality (hereinafter referred to as "f") of not less than 2.9 and containing diphenylmethane diisocyanate in an amount of less than 35% by weight.

22 Claims, No Drawings

FLEXIBLE POLYURETHANE FOAMS AND PROCESS FOR PRODUCING SAME

BACKGROUND OF THE INVENTION

1. Field of the Invention

The present invention relates to a process for producing a flexible polyurethane foam. More particularly, the present invention relates to a process for producing a flexible polyurethane foam which employs as the blowing agent carbon dioxide, which is generated by the reaction of water with free isocyanate groups, and employs a specific diphenylmethane diisocyanates (hereinafter referred to as "MDI") and a specific polyphenylmethane polyisocyanates (hereinafter referred to as "polymeric MDI") as organic polyisocyanate components.

2. Related Background Art

Flexible polyurethane foams are used in a great quantity for cushioning materials for automobiles, furniture, and the like. As the isocyanate component for producing such flexible polyurethane foams, usually used is tolylene diisocyanate solely or a mixture of tolylene diisocyanate and polymeric MDI.

Tolylene diisocyanate and its analogues, however, involve problems in industrial hygiene because of its high vapor pressure, and further, its curing characteristics in foam production are not satisfactory. Moreover, as well known, the foamed products thereof will undergo large compression set particularly under wet and hot conditions, and is subjected to permanent set in fatigue, so that such type of foams are not suitable for uses in which foams may be exposed to moisture and heat, and may be compressed. Accordingly, the MDI type polyisocyanates have come to be used solely for the production of flexible polyurethane foams.

In production of flexible polyurethane foams, water is used as a carbon-dioxide-generating agent in combination with a chlorofluorocarbon as an auxiliary blowing agent to help the blowing action of carbon dioxide. The water generates carbon dioxide gas by the reaction of water with free isocyanate groups, and the carbon dioxide gas serves as the blowing agent.

Since the use of chlorofluorocarbons has come to be severely criticized all over the world, methods are now being investigated for producing a flexible polyurethane foam by employing carbon dioxide, which is generated by the reaction of water with free isocyanate groups, as the substantially sole blowing agent. The single use of an MDI type diisocyanates for producing a flexible polyurethane foam involves a disadvantage that a low density foam material is not readily producible without use of an auxiliary blowing agent in addition to water. For example, Japanese Patent Laid-open Application No. Sho-53-51299 discloses a process for producing a flexible polyurethane foam by the one-shot process by using a mixture of specific composition of MDI and polymeric MDI. In the use of such an isocyanate mixture, the desired foam density and a physical properties are not readily obtainable if trichlorofluoromethane is absent as the auxiliary blowing agent.

SUMMARY OF THE INVENTION

An object of the present invention is to provide a method for producing a low-density flexible polyurethane foam by employing carbon dioxide, which is generated by the reaction of water with free isocyanate groups, as the substantially sole blowing agent, and MDI and the analogues thereof as the sole organic polyisocyanate without impairing the properties of the foam thus prepared.

The present invention provides a method for producing a flexible polyurethane foam by the reaction of a polyol component having active hydrogens, composed of an active hydrogen compound, a blowing agent, and an additive with an organic polyisocyanate compound: the blowing agent being carbon dioxide which is generated by the reaction of water with free isocyanate groups, the organic polyisocyanate compound being a mixture of MDI and polymeric MDI, which the mixture contains the MDI and the polymeric MDI in a mixing ratio of not more than 1.0 and 4,4'-MDI in a ratio of not more than 60% by weight based on the whole isocyanate mixture, and the polymeric MDI having an average functionality (hereinafter referred to as "f") of not less than 2.9 and containing MDI in an amount of less than 35% by weight. It is preferred that the MDI contains 2,2'- and 2,4'-isomers in an amount of 20–50% by weight and that MDI in the polymeric MDI contains 2,2'- and 2,4'-isomers of diphenylmethane diisocyanates in an amount of less than 2% by weight.

The MDI contains 2,2'-, 2,4'- and 4,4'-isomers.

DETAILED DESCRIPTION OF THE PREFERRED EMBODIMENT

The production of a flexible polyurethane foam may be conducted by the "one-shot process" in the present invention.

The organic polyisocyanate employed in the present invention is a mixture of the MDI and the polymeric MDI having f of 2.9 or more, the mixing ratio of the MDI to the polymeric MDI being 1.0 or less and containing MDI in an amount of less than 35% by weight, the mixture containing 4,4'-MDI in an amount of 60% by weight or less based on the whole isocyanate mixture. It is preferred that the MDI contains 2,2'- and 2,4'-isomers in an amount of 20–50% by weight and that MDI in the polymeric MDI contains 2,2'- and 2,4'-isomers of diphenylmethane diisocyanate in an amount of less than 2% by weight. The organic polyisocyanate is blended with an active hydrogen compound known for production of flexible polyurethane foams and an additive, and water is used to generate carbon dioxide gas as the blowing agent to give a foamed product.

The resulting flexible polyurethane foam has high elasticity and excellent tear properties, and can be made low-density even by sole use of MDI without use of an auxiliary blowing agent.

The active hydrogen-containing component used in the present invention includes polyetherpolyols, and other polyols having at least two hydroxyl groups in the molecule, such as polyesterpolyols, epoxypolyols, and the like, and combinations thereof.

The polyetherpolyol can be prepared by addition-polymerizing, in a known method, one or more monomers such as ethylene oxide, propylene oxide, butylene oxide, styrene oxide, epichlorohydrin, and the like to an initiator which has at least two active hydrogen atoms such as ethylene glycol, diethylene glycol, triethylene glycol, 1,2-propylene glycol, trimethylene glycol, 1,3-butylene glycol, tetramethylene glycol, hexamethylene glycol, glycerol, sorbitol, sucrose, trimellitic acid, bisphenol A, ethylenediamine, and the like.

In production of flexible polyurethane foams, water is used as a carbon-dioxide-generating agent usually in combination with a chlorofluorocarbon or a low-boiling solvent as an auxiliary blowing agent to help the blowing action of carbon dioxide gas, which is generated by the reaction of water with free isocyanate groups. However, in the present invention, since the use of chlorofluorocarbons has come to be severely criticized all over the world, water only is employed for generating carbon dioxide as a substantially sole blowing agent.

The additives which may be used in the active hydrogen component in the present invention include a catalyst, a foam stabilizer, and if necessary a flame retardant, a viscosity modifier, a pigment, and the like.

The catalyst includes tertiary amines such as dimethylethanolamine, triethylenediamine, tetramethylpropanediamine, tetramethylhexamethyelediamine, dimethylcyclohexylamine, and the like; organic tin compounds such as stannous octoate, dibutyltin dilaurate, and the like.

The foam stabilizers include various siloxane, polyalkylene oxide block copolymers, and are selected depending on the formulation recipe.

The flame retardant includes tris(chloroethyl) phosphate, tris(chloropropyl) phosphate, tricresyl phosphate, chlorinated paraffin, and the like.

The viscosity modifier includes dibutyl phthalate, dioctyl phthalate, alkylene carbonates, and the like.

In the present invention, an MDI mixture is solely used as the organic polyisocyanate compounds without modification by use of the active hydrogen compound, and carbon dioxide generated by the reaction of water with free isocyanate groups is used as a substantially sole blowing agent. Additionally the MDI mixture employed is within the range specified below, in order to cancel the disadvantages of inferior physical properties of foamed products and difficulty in attaining a lower density.

The MDI mixture is a mixture of the MDI component and the polymeric MDI. The mixture contains the MDI and the polymeric MDI in a mixing ratio of not more than 1.0 and 4,4'-MDI in a ratio of not more than 60% by the weight based on the whole isocyanate mixture, and the polymeric MDI having an average functionality (hereinafter referred to as "f") of not less than 2.9 and containing MDI in an amount of less than 35% by weight. It is preferred that the MDI contains 2,2'- and 2,4'-isomers in an amount of 20–50% by weight and that MDI in the polymeric MDI contains 2,2'- and 2,4'-isomers of diphenylmethane diisocyanate in an amount of less than 2% by weight.

In production of flexible polyurethane foam, in the case where an MDI mixture is solely employed, problems generally arises in impact resilience, elongation properties, tear properties, etc. irrespective of whether the process is a prepolymer method or a one-shot method, and whether an auxiliary blowing agent is used or not. In particular, in the case where water is used for generating carbon dioxide as the blowing agent, a low density of the foam is not attainable. The limitation of the MDI mixture in the present invention is of great significance in cancelling the above disadvantages.

The process for producing a flexible polyurethane foam of the present invention employs a limited MDI mixture, namely a mixture of the MDI and the polymeric MDI in a ratio of not more than 1.0, in which the polymeric MDI contains MDI in an amount of less than 35% by weight and has f of not less than 2.9, and the content of 4,4'-diisocyanate in the mixture of the MDI and the polymeric MDI is not more than 60% by weight. It is preferred that MDI in the polymeric MDI contains 2,2'- and 2,4'-isomers in an amount of less than 2% by weight and that the MDI contains 2,2'- and 2,4'-isomers in an amount of 20–50% by weight. The use of the above specified MDI mixture makes it possible to obviate the difficulty in achieving low density, and solve the problems of low impact resilience, low tear properties, and low elongation properties which are liable to be caused by use of water for generating carbon dioxide as a blowing agent.

The present invention is described in more detail referring examples without limiting it in any way. The "part" and "%" in the examples are based on weight unless otherwise mentioned.

Preparation of Organic Polyisocyanate Compounds

While keeping 500 parts of an MDI containing 2,2'- and 2,4'-isomer mixture in an amount of 25.0% in a liquid state, 500 parts of polymeric MDI which contains MDI at a content of 29.5%, in which 2,2'- and 2,4'-isomers are contained in an amount of 1.3%, and has an f value of 2.96 was added to the liquified MDI. The mixture stirred for about 10 minutes to prepare an organic polyisocyanate compound (A) for blowing tests. This isocyanate compound contains 52.1% 4,4'-MDI.

In the same manner, organic polyisocyanate compounds (B) to (I) were prepared. The organic isocyanate compounds (A) to (I) correspond to Examples, and (G) to (I) correspond to Comparative examples.

Table 1 shows the starting material compositions for the prepared polyisocyanate compounds and the quantities used.

EXAMPLES 1-10, AND COMPARATIVE EXAMPLES 1-3

Flexible polyurethane foams were prepared by use of the organic polyisocyanate compounds (A) to (I). The formulations are shown in Table 2. The blowing rate and the physical properties of the resulting mold foams are shown in Table 3.

TABLE 1

| Organic polyisocyanate compound | (A) | (B) | (C) | (D) | (E) | (F) | (G) | (H) | (I) |
|---|---|---|---|---|---|---|---|---|---|
| MDI 2,2'-and 2,4'- | | | | | | | | | |
| Isomer content (%) | 25.0 | 25.0 | 25.0 | 35.0 | 35.0 | 35.0 | 10.0 | 25.0 | 25.0 |
| Quantity (parts) | 500 | 500 | 400 | 500 | 500 | 450 | 500 | 500 | 600 |
| Polymeric MDI | | | | | | | | | |
| MDI content (%) | 29.5 | 33.8 | 33.8 | 28.7 | 34.4 | 34.4 | 29.5 | 48.0 | 48.0 |
| Isomer content in MDI (%) | 1.3 | 0.8 | 0.8 | 1.5 | 0.9 | 0.9 | 1.3 | 0.6 | 0.6 |
| f | 2.96 | 2.92 | 2.92 | 2.98 | 2.91 | 2.91 | 2.96 | 2.67 | 2.67 |
| Quantity (parts) | 500 | 500 | 600 | 500 | 500 | 550 | 500 | 500 | 400 |
| 4,4'-MDI content in the mixture (%) | 52.1 | 54.3 | 50.1 | 46.6 | 49.5 | 48.0 | 59.6 | 61.4 | 64.1 |
| Mixing ratio | 1.0 | 1.0 | 0.67 | 1.0 | 1.0 | 0.82 | 1.0 | 1.0 | 1.5 |

TABLE 1-continued

| Organic polyisocyanate compound | (A) | (B) | (C) | (D) | (E) | (F) | (G) | (H) | (I) |
|---|---|---|---|---|---|---|---|---|---|
| NCO content of organic polyisocyanate (%) | 31.7 | 31.8 | 31.5 | 31.7 | 31.8 | 31.7 | 31.7 | 32.2 | 32.4 |

TABLE 2

| | Example | | | | | | | | | | Comparative Example | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Active hydrogen-containing component (Parts) | | | | | | | | | | | | | |
| Polyetherpolyol 1) | 100 | | 100 | 100 | | 100 | | 100 | 100 | | | | |
| Polyetherpolyol 2) | | 100 | | | 100 | | 100 | | | 100 | 100 | 100 | 100 |
| Polyetherpolyol 3) | | 2.0 | | | 2.0 | | 2.0 | | | 2.0 | 2.0 | 2.0 | 2.0 |
| Polyetherpolyol 4) | 1.0 | | 1.0 | 1.0 | | 1.0 | | 1.0 | 1.0 | | | | |
| Water | 3.8 | 3.8 | 3.8 | 3.8 | 3.8 | 3.8 | 3.8 | 3.8 | 3.8 | 3.8 | 3.8 | 3.8 | 3.8 |
| TOYOCAT-ET 5) | 0.1 | 0.1 | 0.1 | 0.1 | 0.1 | 0.1 | 0.1 | 0.1 | 0.1 | 0.1 | 0.1 | 0.1 | 0.1 |
| TEDA-L33 5) | 0.4 | 0.35 | 0.5 | 0.3 | 0.3 | 0.35 | 0.3 | 0.4 | 0.3 | 0.3 | 0.6 | 0.6 | 0.65 |
| Foam stabilizer 6) | 0.7 | 0.7 | 0.7 | 0.7 | 0.7 | 0.7 | 0.7 | 0.7 | 0.7 | 0.7 | 0.7 | 0.7 | 0.7 |
| Organic polyisocyanate compound (parts) | (A) 56.4 | (A) 55.5 | (B) 56.3 | (C) 56.6 | (C) 55.8 | (D) 56.3 | (D) 55.5 | (E) 56.2 | (F) 56.3 | (F) 55.5 | (G) 55.8 | (H) 55.0 | (I) 54.7 |
| Isocyanate index | 90 | 90 | 90 | 90 | 90 | 90 | 90 | 90 | 90 | 90 | 90 | 90 | 90 |

Note:
1) f = 3, MW = 6500, EO content = 9%
2) f = 3, MW = 7650, EO content = 15%
3) f = 4, MW = 8000, EO content = 80%
4) f = 2, MW = 4700, EO content = 80%
5) Catalyst, made by Tosoh Corporation
6) Sz-1306, made by Nippon Unicar K.K.

TABLE 3

| | Example | | | | | | | | | | Comparative Example | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Foaming rate (seconds) | | | | | | | | | | | | | |
| Cream time | 10 | 10 | 9 | 11 | 12 | 11 | 11 | 10 | 11 | 11 | 8 | 8 | 8 |
| Gel time | 92 | 90 | 83 | 98 | 102 | 93 | 100 | 90 | 99 | 103 | 76 | 73 | 82 |
| Rise time | 121 | 116 | 110 | 129 | 130 | 123 | 133 | 122 | 130 | 136 | 104 | 100 | 113 |
| Free rise density (kg/m$^3$) | 40.2 | 38.6 | 39.0 | 39.2 | 39.8 | 38.7 | 40.0 | 38.3 | 39.5 | 40.1 | 42.5 | 41.8 | 41.6 |
| Foam properties 1) | | | | | | | | | | | | | |
| Overall density 2) (Kg/m$^3$) | 50.1 | 47.6 | 49.2 | 48.6 | 49.5 | 47.4 | 49.8 | 48.1 | 49.4 | 49.5 | 54.5 | 53.6 | 55.0 |
| 25% ILD (Kg/200 mm diam.) 2) | 20.3 | 19.5 | 20.0 | 19.9 | 20.0 | 19.4 | 20.1 | 19.6 | 20.1 | 20.6 | 21.6 | 20.8 | 22.5 |
| Resilience (%) 2) (Ball rebound resilience) | 66.0 | 64.5 | 64.5 | 66.5 | 64.0 | 65.0 | 64.5 | 64.0 | 65.5 | 65.5 | 58.5 | 56.5 | 55.0 |
| Tensile strength 3) (Kg/cm$^2$) | 1.45 | 1.44 | 1.45 | 1.78 | 1.66 | 1.60 | 1.54 | 1.55 | 1.60 | 1.65 | 1.33 | 1.27 | 1.24 |
| Elongation (%) (Elongation rate) | 134 | 138 | 129 | 122 | 120 | 136 | 134 | 139 | 128 | 124 | 116 | 124 | 127 |
| Tear strength 3) (Kg/cm) | 0.84 | 0.88 | 0.86 | 0.92 | 0.94 | 0.83 | 0.82 | 0.84 | 0.93 | 0.91 | 0.69 | 0.62 | 0.66 |
| 50%-compression set 2) at original state (%) (Thickness change rate) | 3.3 | 3.6 | 4.0 | 2.7 | 2.9 | 3.4 | 3.2 | 3.8 | 2.9 | 2.8 | 5.7 | 6.4 | 7.6 |

Note:
1) Molded product in an aluminum mold 300 × 300 × 100 mm, Mold temperature: 53 ± 3° C., Mold release: 4 minutes
2) JIS K 6401
3) JIS K 6301

We claim:

1. A low density, flexible polyurethane foam produced from the reaction of an active-hydrogen-containing component with an organic polyisocyanate compound, wherein the active-hydrogen-containing component comprises an active hydrogen compound, an additive, and a blowing agent, the only blowing agent being carbon dioxide which is generated by the reaction of water with free isocyante groups, and wherein the organic polyisocyanate compound is a mixture of diphenylmethane diisocyanate and polyphenylmethane polyisocyanate in a ratio of not more than about 1.0 mole of diphenylmethane diisocyanate per mole of polyphenylmethane polyisocyanate, wherein the diphenylmethane diisocyanate comprises (a) from about 20% by weight to about 50% by weight of a mixture of 2,2'- and 2,4'-isomers, and (b) from about 80% by weight to about 50% by weight of 4,4'-isomer, the isocyanate mixture containing not more than about 60% by weight of the 4,4'-isomer of diphenylmethane diisocyanate, and the polyphenylmethane polyisocyanate having an average functionality of not less than about 2.9 and containing less than about 35% by weight of diphenylmethane diisocyanate.

2. The foam of claim 1 wherein the polyphenylmethane polyisocyanate contains less than about 2% by weight of a mixture of the 2,2'- and 2,4'-isomers of diphenylmethane diisocyanate.

3. The foam of claim 1 wherein the active-hydrogen-containing component is selected from the group consisting of polyether polyols, polyester polyols, epoxy polyols, and mixtures thereof.

4. The foam of claim 3 wherein the polyether polyol is prepared from the addition-polymerization reaction of a monomer with an initiator, the initiator having at least two active hydrogen atoms.

5. The foam of claim 4 wherein the initiator is selected from the group consisting of ethylene glycol, diethylene glycol, triethylene glycol, 1,2-propylene glycol, trimethylene glycol, 1,3-butylene glycol, tetramethylene glycol, hexamethylene glycol, glycerol, diglycerol, sorbitol, sucrose, trimellitic acid, bisphenol A, and ethylenediamine.

6. The foam of claim 4 wherein the monomer is selected from the group consisting of ethylene oxide, propylene oxide, butylene oxide, styrene oxide, and epichlorohydrin.

7. The foam of claim 1 wherein the additive is selected from the group consisting of catalysts, foam stabilizers, flame retardants, viscosity modifiers, pigments, and mixtures thereof.

8. The foam of claim 1 wherein the additive is a catalyst selected from the group consisting of tertiary amines, organic tin compounds, and mixtures thereof.

9. The foam of claim 8 wherein the tertiary amine is selected from the group consisting of dimethylethanolamine, triethylenediamine, tetramethylpropanediamine, tetramethylhexamethylenediamine, and dimethylcyclohexylamine.

10. The foam of claim 8 wherein the organic tin compound is stannous octoate or dibutyltin dilaurate.

11. The foam of claim 7 wherein the foam stabilizer is a siloxane-polyalkylene oxide block copolymer.

12. A method for producing a low density, flexible polyurethane foam by the reaction of an active-hydrogen-containing component with an organic polyisocyanate compound, wherein the active-hydrogen-containing component comprises an active hydrogen compound, an additive, and a blowing agent, the only blowing agent being carbon dioxide which is generated by the reaction of water with free isocyanate groups, and wherein the organic polyisocyanate compound is a mixture of diphenylmethane diisocyanate and polyphenylmethane polyisocyanate in a ratio of not more than about 1.0 mole of diphenylmethane diisocyanate per mole of polyphenylmethane polyisocyanate, wherein the diphenylmethane diisocyanate comprises (a) from about 20% by weight to about 50% by weight of a mixture of 2,2'- and 2,4'-isomers, and (b) from about 80% by weight to about 50% by weight of 4,4'-isomer, the isocyanate mixture containing not more than about 60% by weight of the 4,4'-isomer of diphenylmethane diisocyanate, and the polyphenylmethane polyisocyanate having an average functionality of not less than about 2.9 and containing less than about 35% by weight of diphenylmethane diisocyanate.

13. The method of claim 12 wherein the polyphenylmethane polyisocyanate contains less than about 2% by weight of a mixture of the 2,2'- and 2,4'-isomers of diphenylmethane diisocyanate.

14. The method of claim 12 wherein the active-hydrogen-containing component is selected from the group consisting of polyether polyols, polyester polyols, epoxy polyols, and mixtures thereof.

15. The method of claim 14 wherein the polyether polyol is prepared from the addition-polymerization reaction of a monomer with an initiator, the initiator having at least two active hydrogen atoms.

16. The method of claim 15 wherein the initiator is selected from the group consisting of ethylene glycol, diethylene glycol, triethylene glycol, 1,2-propylene glycol, trimethylene glycol, 1,3-butylene glycol, tetramethylene glycol, hexamethylene glycol, glycerol, diglycerol, sorbitol, sucrose, trimellitic acid, bisphenol A, and ethylenediamine.

17. The method of claim 15 wherein the monomer is selected from the group consisting of ethylene oxide, propylene oxide, butylene oxide, styrene oxide, and epichlorohydrin.

18. The method of claim 12 wherein the additive is selected from the group consisting of catalysts, foam stabilizers, flame retardants, viscosity modifiers, pigments, and mixtures thereof.

19. The method of claim 12 wherein the additive is a catalyst selected from the group consisting of tertiary amines, organic tin compounds, and mixtures thereof.

20. The method of claim 19 wherein the tertiary amine is selected from the group consisting of dimethylethanolamine, triethylenediamine, tetramethylpropanediamine, tetramethylhexamethylenediamine, and dimethylcyclohexylamine.

21. The method of claim 19 wherein the organic tin compound is stannous octoate or dibutyltin dilaurate.

22. The method of claim 18 wherein the foam stabilizer is a siloxane-polyalkylene oxide block copolymer.

* * * * *